(12) United States Patent
Modi

(10) Patent No.: US 9,996,819 B1
(45) Date of Patent: Jun. 12, 2018

(54) VOICE PROGRAMMABLE AUTOMATIC IDENTIFICATION AND DATA CAPTURE DEVICES AND SYSTEM

(71) Applicant: Sankalp Sandeep Modi, Acton, MA (US)

(72) Inventor: Sankalp Sandeep Modi, Acton, MA (US)

( * ) Notice: Subject to any disclaimer, the term of this patent is extended or adjusted under 35 U.S.C. 154(b) by 0 days. days.

(21) Appl. No.: 15/479,241

(22) Filed: Apr. 4, 2017

Related U.S. Application Data

(60) Provisional application No. 62/432,667, filed on Dec. 11, 2016.

(51) Int. Cl.
| | |
|---|---|
| *G06K 19/00* | (2006.01) |
| *G06Q 10/08* | (2012.01) |
| *G06F 17/30* | (2006.01) |
| *G10L 15/22* | (2006.01) |
| *G10L 15/04* | (2013.01) |
| *G06F 17/24* | (2006.01) |
| *G06Q 10/10* | (2012.01) |
| *G06K 7/00* | (2006.01) |

(52) U.S. Cl.
CPC ......... *G06Q 10/087* (2013.01); *G06F 17/241* (2013.01); *G06F 17/30144* (2013.01); *G06F 17/30752* (2013.01); *G06K 7/0004* (2013.01); *G06Q 10/107* (2013.01); *G10L 15/04* (2013.01); *G10L 15/22* (2013.01)

(58) Field of Classification Search
USPC .......................... 235/435, 439, 451, 487, 492
See application file for complete search history.

(56) References Cited

U.S. PATENT DOCUMENTS

| | | | | |
|---|---|---|---|---|
| 2011/0193716 | A1* | 8/2011 | Goff ..................... | G07G 1/0054 340/686.6 |
| 2014/0138440 | A1* | 5/2014 | D'Ambrosio ........ | G06Q 10/087 235/385 |

* cited by examiner

*Primary Examiner* — Matthew Mikels

(57) ABSTRACT

The proposed invention significantly lowers the burden of electronics data entry, as well as maintenance and configuration of an Automatic identification and data capture (AIDC) system, by making it programmable by voice and using artificial intelligence. Specifically, it proposes an AIDC sensor equipped storage container and AIDC system which can track items equipped with one or more AIDC tags, and any data can be associated, augmented, modified, removed or rewritten by using voice interaction by a user.

20 Claims, 1 Drawing Sheet

Proposed voice programmable AIDC system

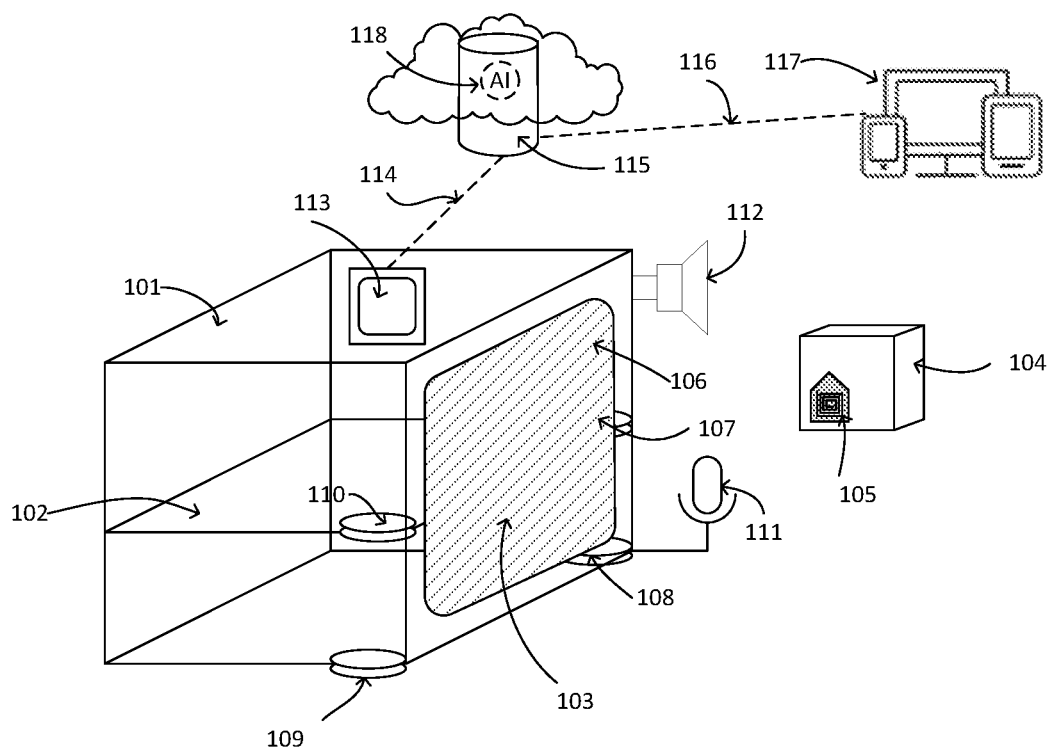
Proposed voice programmable AIDC system ns with only one opening. That is, the presented technique can be extended to multiple openings by implementing a plane crossing detection mechanism for all planes.

VOICE PROGRAMMABLE AUTOMATIC IDENTIFICATION AND DATA CAPTURE DEVICES AND SYSTEM

BACKGROUND

Automatic identification and data capture (AIDC) refers to the methods of automatically identifying objects, collecting data about them, and entering that data directly into computer systems (i.e. without human involvement). AIDC technologies include barcodes, RFID, bokodes, OCR, magnetic stripes, smart cards and biometrics (like iris and facial recognition system). AIDC system typically consists of AIDC tags and AIDC sensor connected to processing units.

AIDC systems have been used in commercial systems extensively for inventory management and logistic tracking. However, it has not got much of traction in consumer market in home settings. One of the main hurdles for adopting such a system for such market is the cost of programming and maintaining AIDC system using data entry for various items. In order for AIDC systems to be useful, generally each AIDC tag must be associated with some useful data at least once (such as what that AIDC tag is attached to). Such data is typically entered using data entry in an electronic form. Moreover, over time, such associated data is augmented, modified, removed or rewritten, which also require additional data entry work. Even when data is available in an electronic form, association/modification of that data to AIDC tag with correct configuration can be complicated. Such tasks, as well as electronic data entry, are typically time consuming and inconvenient which require significant time, effort and technical know-how by the user. Without the economy of scale, cost and inconvenience of such tasks frequently outweigh the advantages of using AIDC system. For the same reasons, AIDC systems have not been successful in small business or developing countries, as the overhead and cost of implementing such systems eclipse the benefits.

PROPOSED INVENTION

The proposed invention significantly lowers the burden of electronics data entry, as well as maintenance and configuration of the system, by making it programmable by voice and using artificial intelligence. Specifically, it proposes an AIDC sensor equipped storage container and AIDC system which can track items equipped with one or more AIDC tags, and any data can be associated, augmented, modified, removed or rewritten by using voice interaction by a user.
Description Attached FIG. 1 presents the proposed voice programmable AIDC system.

101 is a storage container where physical items are stored and retrieved by the user. Such storage item may be of any size (small box, large warehouse). It may be stationary or mobile (e.g. enclosed container in a truck.) It may provide additional services apart from storage, e.g. refrigeration.

102 is a division of the container that divides containers in separate sections (e.g. shelf in a cabinet). Such division may be physical or logical.

103 (plane with the gray diagonal pattern in FIG. 1.) is the plane of opening/accessing the container. Items can only move in and out of the container by crossing the plane. Container may have more than one opening/access planes. For simplicity and brevity, the document describes operations with only one opening. That is, the presented technique can be extended to multiple openings by implementing a plane crossing detection mechanism for all planes.

104 represents any physical storage item that a user wishes to store and retrieve from the container.

105 is an AIDC tag. Such tag may be integrated part of the storage item or it may be removable and attachable to the storage item.

106 is an AIDC detector which can (a) detect AIDC tag crossing the access plane and/or (b) presence/absence of AIDC tag in container. Such detection may require a special user action (such as bringing AIDC tag near to sensor) or it may happen without any special action from the user (e.g. just passing AIDC tag from the opening.) One or more AIDC sensor may be used for one container. Such AIDC sensors may be mounted on/integrated in the container or it may be separate and kept nearby its opening.

107, 108, 109, 110 are optional auxiliary sensors which is able to detect, without the use of AIDC tag, (a) a storage item crossing the access plain and/or (b) addition/subtraction of storage item in the container (e.g. optical obstacle detector, camera, etc.). Moreover, such sensors may provide additional information about items, e.g., weight sensor can provide storage item weight. Moreover, auxiliary sensor may be able to provide more granular information about the location of the storage item within the container. (E.g. which shelf the item is placed.) One or more auxiliary sensors may be used for the same container.

111 is a microphone which is used by the user to provide information to the AIDC system. 112 is a speaker that AIDC system utilizes to inform and inquire the user.

111 and 112 may be integrated in (or mounted on) container or it may be separate (e.g. in a user's mobile phone)

113 is a processor unit that is connected (either wired or wirelessly) to AIDC sensor (106), auxiliary Sensors (107-110), microphone (111) and speaker (112). Processor unit is able to read and command connected components. 113 may be integrated in (or mounted on) container or it may be separate (e.g. in a user's mobile phone)

Processor unit 113 is connected vial link 114 to a network connected server (e.g. cloud server) 115. This server may contain a database to keep track of the items (104) in one or more containers (101).

Moreover, server (115) may store and execute Artificial Intelligence (AI) module (118). Such AI module may possess capabilities of multiple relevant domains, including but not limited to, audio processing, speech recognition, natural language processing, machine learning, expert systems and user behavior prediction for inventory management. Optionally, all or a part of the AI module (118) may be stored and executed on processing unit (113) or end-user computing devices (117).

Server (115) is connected to end-user computing devices 117 (e.g. Mobile phone or PC) via link 116, which enable 117 to view and modify data or configuration of the proposed AIDC system. End-user computing device (117) may be mounted on the container (101) itself, such as touch screen display.

Each storage item (104) may be associated with "title information" (e.g. Name, identification number, category, or ingredient.) which helps users to recognize the item, type of the item or content of the item. Apart from the title information, and item may be associated with metadata which provides additional information (e.g. expiry date, quantity, intended use, the target user information, notes etc.). Content/components of such title information and metadata are customizable by the user.

Operation

Any speech input from a user, provided via microphone (111), is transmitted to the processing unit (113) for processing and recognition. Processing unit (113) may further send the speech (or processed information about the speech, or both) to the networked server for interpreting and understanding the speech input. After recognizing the speech, AI module determines and executes the appropriate action (such as updating inventory in data base). Additionally, AI module may inform the user about the action taken or ask for more information via speaker (113).

When a user adds or removes a storage item (104) with AICD tag (105) through opening (103) inside/outside of the container (101), such event is detected by AIDC detector (106), and conveyed through processing unit (113) and link (114) to networked server (115).

AIDC system's operates on the contextual information exchange i.e. once the AIDC tag (105) is detected going inside or outside of the storage container (101), current context is set to detected AIDC tag (105) and information passed to/from the user using speech/audio it regarding the storage item (104) is associated with the detected AIDC tag (105), unless explicitly stated otherwise. This kind of contextual processing is a one of the key part to increase user-friendliness of the proposed invention.

Here, after any addition/removal of AIDC tag (105) from container (101), if any title information is available, AIDC system may announces the title information to the user via speaker (112). In response, the user may ask for adding or modifying the title information and any associated metadata data by speaking into microphone (111).

If no AIDC tag (105) is attached to the storage item (104), auxiliary sensors (107-110) may still be able to detect the event of addition/removal of the storage item (104) in the container (101). In such cases, the user is prompted via speaker (112) to attach the AIDC tag and repeat the addition/removal action. If AIDC tag (105) is attached to the storage item (104), any information obtained by using axillary sensors (107-110) (e.g. weight or the item from weight sensors, or brand of the item using camera) is automatically associated with the detected AIDC tag (105).

For each entry and exit of a storage item, the processing unit (113) receives data about the entry/exit even, detected AIDC tag identification, event timing, title information, metadata and information provided by auxiliary sensors. This data is passed to networked server (115) and it is processed, analyzed and stored by AI module (118) in the network server (115). Alternatively, some or all of such processing and analysis may be performed in the processing unit (113).

Processing of this raw data by AI combined with information from external sources (such as internet) may generate, a number of useful derived information and metadata regarding the item (e.g., creation of reminder for removal of an item). Moreover, history of the raw data, the derived information and calculated statistics may be maintained in the server (115), which may be used for AI for machine learning. Data stored on server made available to the en-user devices using an Application (e.g. App in mobile phone).

Techniques to Improve Usability and Operations with Voice Inputs

Current speech recognition system has limited accuracy, particularly when it comes to special names which are not part of language dictionary. In case of inventory management, such names frequently carry significant and crucial information. E.g. Name of medicine, ethnic food items name etc. The challenge is compounded when such names are pronounced by using different users with widely varying accents. The proposed invention utilizes a number of techniques to alleviate the problem and make the system more user-friendly.

(1) Storing, differentiating and utilizing original speech segment: Irrespective of how well the user speech segment is recognized, the original speech segment may also be stored with associated AIDC tag, and replayed to the user when possible (and appropriate). For example, name of an item will be read back to the user in user's voice. The item is identified by characteristics of sound of its title information (a.k.a. sound signature) rather than the recognized name. This way, even if the name is not recognized properly, many of the inventory management functions can work, as long as 'sound signature' of the title information is distinguishable compared to the sound signature of the other items in the storage container. This is particularly important when system encounters names missing from standard vocabulary e.g. ethnic food name "aalogobhi".

(2) Interactive mode with immediate feedback: AI module (118) may ask for clarification to the user if AI is not able to understand (or have ambiguity regarding) a part or the whole of the speech input provide by the user. Moreover, AI module may selectively convey back recognized segment of the speech (or information derived from it) for confirmation. Such information is also immediately made available to end-user computing devices (117) for visual confirmation. The user is able to correct any misrecognized/incorrect information through new voice commands or interacting with any end-user computing devices. Contextual nature of the interaction makes these actions more user-palatable.

(3) Narrow domain and adaptive AI: Unlike general speech processing, (e.g. dictation), interaction about the storage management and related activities requires much smaller set of options and vocabulary. Moreover, depending upon the application of the storage, this vocabulary can be narrowed even further. For example, working with kitchen refrigeration, drug storage and filing cabinet is likely to have different distinct vocabularies and/or sentence structure; and AI module may avail the knowledge about the application to improve speech recognition. Furthermore AI may utilize the history of user actions/correction for deep learning and adaptive user action prediction to improve speech recognition and other functionality by mapping it to application-specific and user-specific actions.

(4) Limited language patterns and keywords/key phrases: To improve operations for certain applications, the proposed AIDC system may restrict acceptable user input to certain language patterns (e.g. all user inputs must be imperative sentences.) Moreover, system instruction may provide the user a list of certain limited keywords/or key phrases for performing specific actions or conveying specific information (e.g. "Reminders after 3 days", "Expires on").

(5) Only relevant and unobtrusive feedback though adaptive AI: One of the most important usability aspect of the proposed AIDC system is that the system provides only relevant and timely feedback and information, through adaptive learning in AI. Some examples are: (a) if a user asks same type of question about metadata repeatedly for a particular type of item, next time when such item entry/exit is detected system provides that information without the user asking for it (2) When a user cuts off the additional information being provided by the system, particularly with some key phrases like "yeah, that's enough", next time information will be curtailed for the item. (The system continues to listen to the user even while providing the information through the speaker.) (c) AI attempts to detect distinct mode of operation and predict operation/behavior based on all information available. For instance, when significant number of items is rapidly exiting/entering the system, the user may be performing restocking in bulk and the user may not be interested in hearing metadata or even title information for all items. AI system may learn from one user or by combining multiple user data from cloud services.

(6) Interactive and configurable through end-user computing devices: all system settings and data may be made available through applications on end-user computing devices with user familiar interfaces, instead of crammed, inflexible and unappealing user-interface mounted generally on storage container.

(7) Use of metadata to provide other Internet connected services: Since a user can attach any metadata easily with any tag, it creates a rich platform for providing a number of other Internet connected services, based on metadata, such as emails notification, calendar event, produce shopping list, ordering low stock item etc.

(8) Many products come with inbuilt AIDC tag, e.g. UPC barcode. With barcode reader, the proposed system can look up the UPC barcode and fetch the related data, if available, and announce it to the user. The user can augment or modify the data. More importantly, in case where the barcode is unrecognized, the user can instruct the system what it is. The system learns and remembers the information associated with the barcode. Next time when the same barcode is detected, the system will recognize it and announce the associated information.

Specific Application—Content-Aware Smart Kitchen Refrigerator

One of the very useful application for the system is for making smart kitchen refrigerator. Current issue with the so called "smart" refrigerator (a.k.a. fridge) in the market is that it does not have very user-friendly, general and robust system to make it content aware. The typical current techniques used for detecting contents are:

(1) Use of cameras to read the labels for items: this method is not robust or user friendly because (a) it difficult to get clear shot of labels in congested fridge. (b) The user hands may be blocking the view. (c) You may need many cameras from different angle to overcome (b), making system very costly (d) Optical character recognition technology is not robust to recognize the content, particularly, when image is captured from video frame of a moving object. (e) Cannot detect content in user utensils (e.g. left overs or cooked item) which are not labeled. Not only adding written label for each of utensil is cumbersome, the same utensils are reused with different content which requires removing previous labelling and relabeling them. (f) If the user has to add any metadata, they have to manually type the information in some input devices.

(2) Use barcode reader: this method is inconvenient and limited. (a) There is no universal barcode system with associated data base. Each store or manufacturer may have its own barcode system. Hence, even after reading the barcode on product, that bar code may not be correctly recognized. (b) Range of barcode reader is limited, and barcode of product must be brought nearer to the reader, facing the reader. Performing this special action every time putting or taking away each item from fridge is cumbersome. Limitation of (1)(e-f) also applies.

The proposed solution is to adopt system proposed in Section 2 as following:
1. Fridge as storage container (101)
2. Shelf in the fridge as division of the container (102)
3. Door of the fridge as plain of opening/access (103)
4. Any storage item (box/bottle/utensil) for fridge is a storage item (104)
5. A passive/active RFID tag as AIDC tag (105). Tags should be easily attachable and removable for any container, like reusable stickers
6. RFID detector as AIDC detector (106) which can either (a) detect an RFID tag going in or out of the fridge door or (b) it can detect presence or absence of an RFID tag in the fridge. This RFID detector should be ideally capable of performing detection of RFID tag attached with storage items with natural user actions of putting things in an out of the fridge, (without requiring special user action or consideration like hand and tag placement.)
7. Weight sensors under each shelf are auxiliary sensors (107,110). Not only such weight sensor can identify entry and exit event by monitoring weight change, it can provide weight information about the identified items.
8. Microphone (111) and speaker (112) are embedded in (or attached to) the fridge door opening.
9. Processing unit is an embedded processor (113) that is connected to internet and sensors. It is connected to Server (115) running AI module (118) through internet.
10. Mobile Phone, tablet or PC are end-user devices (117), which access server data through special apps.

Detection of RFID tag going in or out of the fridge is indicated by distinct short sound on speaker like "Beep" or "Ding". Title information of the storage item will be provided by the user which will be typically the name of the content in the storage item.

Operation

When a user opens the door of such fridge and puts in (or takes away) any item with RFID tag in the fridge, the fridge detects it with a "Ding" sound. If no item name is associated with tag, fridge asks the user (through voice on speaker), to identify the item. The user may provide the name of the item along with any metadata by speaking through the microphone.

If the tag has associated item name from its last use, fridge announce the name (along with any information deems pertinent by AI module and system configuration). The user may override the name and/or add/override metadata data by speaking new name/metadata. Example of such metadata and related system action is provided in a sample scenario at described in section 3.1.1.

If the item has no associated tag, weight sensors will still detect entry/exit event due to detected weight change, and prompt the user to add a tag to the item.

Announcing the name and some metadata may be performed by replaying the recorded user voice to minimize the effect of limitations of speech recognition. In cases where announcement is not configured to be performed using recorded the user voice, the user can ask to replay it in original recorded voice and issue commands for further actions.

Sample Usage Scenario:

[Scene] User Julia came home after light grocery shopping and wishes to add some of shopped item in the fridge while also reviewing the existing content of the fridge. The user interacts with fridge using microphone and speakers. Any update in content detected by the fridge is conveyed to connected cloud server. For simplicity, the entire AIDC system will be referred as fridge, in this scenario, because that is what the user perceives.

Julia opens the fridge door.

[Fridge]: "Welcome back." Here, it is a greeting message.

[Julia:]: "Hello, Alice. Julia here. "Here, Alice is the user-give name of this fridge. Julia indemnifies herself as the user. This puts smart fridge in the context of the user Julia.

Julia takes a grab a bag of tomatoes from shopping bag, add an RFID stickers, and puts bag in the fridge. As tomatoes bag is crossing the door, system detects the RFID tag with "Ding" sound and Julia says

[Julia:] "Tomatoes." Fridge registers that tag is associated with tomatoes and its weight (using difference in weight registered by weight sensors.)

Julia takes a milk carton from shopping bag, adds an RFID sticker, and puts the item in the fridge. As milk is crossing the door, system detects the RFID tag with "Ding" sound and Julia says

[Julia:] "Milk. Expires in two weeks." Here, meta data is being added in natural language. Fridge registers item name and the weight with the tag and also adds expiry date for the item. This expiry date can be used for multiple purposes, like creating reminder or viewing items by expiry date in mobile app etc. If Julia did not add expiry date, fridge will still estimate it based on cloud analytics.

Julia added an item with a tag but forgot to say the name.

[Fridge:]: "That's new, what is it?" This is a feedback/question in natural language by the system.

[Julia:] "It's Peach". The fridge is still in the context of the last detected tag. Hence, its name and weight is added to the tag.

Julia takes out a container to make space. System detects out going object with "Ding" and based on the last used name, announces

[Fridge:] "Soup."

Julia takes out the container. System recognizes it with "Ding" and announces

[Fridge:] "Blueberries."

[Julia:] "Discard this".

[Fridge:] "OK. Discarded" Fridge resets any information associated with that tag. Tag can now be reused for another item. Moreover, it registers the waste item with its weight. This is used for maintaining waste statistics and history.

Julia adds another bag with tag.

[Julia:] "Red papers. Add note: this is for Friday dinner." System registers the name and its weight for the tag. Moreover, metadata is used for meal planning app.

Julia takes out some soup that was outside, pour some of it in another bowl and puts back soup bowl. System recognizes with "Ding" and announces "Soup." Weight change will be noted to know consumption of soup from the container.

Julia puts a box of pasta but forgot to put a tag.

[Fridge:] "No tag? Can you add one?"

Julia takes it out, adds tag and puts it back.

[Julia:] "Pasta. Remind me to finish by tomorrow evening."

[Fridge:] "OK." Name and weight is added for the tag and reminder is created for tomorrow evening.

Julia puts a new container with tag and Fridge recognizes it as "Oatmeal".

[Julia:] "No, it's Lasagna now."

[Fridge:] "OK, updated." Tag information is overridden here.

Julia adds a box with a tag.

[Julia:] "Cake. Add note to share with neighbors." Note in original voice will be associated with tag along with name and weight.

Julia is planning to close the fridge.

[Julia:] "Bye Alice."

[Fridge:] "Wait, you have expired humus in the top shelf and stole raspberry on the bottom shelf." Here, AI module decides to volunteer some pertinent information.

Julia takes out humus. Fridge recognizes it with "Ding" and announces "Humus."

[Julia:] "Discard this."

[Fridge:] "OK, discarded"

Julia takes out raspberries. Fridge recognizes it with "Ding" and announces "Raspberries".

Julia examines raspberries and puts it back in the fridge. Fridge recognizes it with "Ding" and announces "Raspberries".

[Julia:] "These are still good for two days. Remind me to take to office tomorrow."

[Fridge:] "OK, updated." Fridge updates expiry date for the tag and creates a reminder service. Here information associated with the tag is reprogrammed on-the-fly using voice command.

Specific Applications—Storage Cabinets

Medicine Cabinets

Here, medicine cabinet is the storage container, medical supplies (bottles, strips etc.) are storage items. Items can be attached with an active/passive tags RFID tags. RFID detector detects movement of tag going in and out of the cabinet. Microphone and speaker are embedded in (or attached to) the cabinet.

Similar to the operation described in section 3.1, user will pronounce the name of the item and other associated useful information (expiry, quantity, purpose, dosage) when putting in the item first time. From then on, system will announce existing information while taking out or putting the item with the same tag and the user can modify the information through voice input if needed.

All the information stored in the system is accessible via user devices like mobile phones or tablets via internet connected server.

For cost saving purpose, RFID tag and sensor can be replaced by barcode stickers and sensors. Here users need to perform the additional action to bring the barcode near to the sensor while taking out or putting items in the cabinet. The barcode may be the build-in UPC code on the medical product.

Both small hospitals and home medicine cabinets can benefit from this invention. Every year, millions of dollars of medicine is expired and wasted all around the world in home cabinets or small hospitals due to lack of easy-to-use cost effective inventory system. With internet connected medical cabinets, aggressive medicine donation programs can be setup to reduce this waste. Moreover, data related to consumer medicine usage and patterns are very valuable for consumer research and medical research alike.

Document Filing Cabinets

Despite progress in electronic documentation, we still deal with very large number of important printed documents during our life. The situation is even worse in developing countries where laws require you to maintain printed documents. Keeping track of all available personal documents in house or commercial documents in a small company is a cumbersome and error prone task.

With the proposed system with barcode as AIDC tag and barcode sensor as AIDC sensors, user can simply put barcode label on the document, scan the code in barcode reader and announce the relevant information. This information can include additional information about location such as "Home Insurance Records. It is placed in to top drawer in a green file along with property tax records." This way, one scanner can be used for multiple cabinets and it can be completely mobile. In fact, mobile phone itself can act as multiple components in the proposed system (mic, speaker, processing unit and scanner) and system can be implemented without any physical modification to the filing cabinet.

Specific Application: Warehousing

There is no restriction on the size of the storage container. The container can be an entire warehouse or a shop, where door or checkout point will become access planes. For instance, a small shop in a developing country can print its own barcode labels and quickly associate item name and price with the barcode without any manual data entry on computer. This will allows small shop keepers to avail the same benefits of sophisticated inventory management and analysis that is currently only available to big stores who can afford high volume systems with associated data entry costs.

Specific Application: Wine Connoisseur or Shop Assistant

A wine shop can install the proposed system to improve its user experience. RFID AIDC tags will be attached to wine bottles and RFID AIDC sensors will installed near the entrance of the wine cabinet. Here, not only wine shop can an get automated inventory management system and can also get a virtual wine connoisseur or assistant. When a customer picks up a bottle from a cabinet shelf, system will detect the movement and provide information about the vine that customer picked up, such as wine's name, history and pedigree, taste attributes and compatible food/beverage combinations via speaker. Such information may be pre-recoded by wine shop owner, wine producer or any third party. Alternatively such information may be retrieved from internet/database in the text form and conveyed to user using voice synthesizer.

Similarly, the system can act as a knowledgeable assistant in any shop or settings where knowledge about individual item is frequently desired by users. For example, antique shops or handicraft shops. Frequently such information is a key ingredient for successful sale to shoppers and it takes long time to train and retain knowledgeable employees. Moreover, an employee can handle only one customer at a time while the proposed system can act independently and automatically for each cabinet, making it much more scalable.

Embodiment of the Computing System and Software

Embodiments of the invention may be implemented on a computing system. Any combination of mobile, desktop, server, router, switch, embedded device, or other types of hardware may be used. For example, a computing system may include one or more computer processors, non-persistent storage (e.g., volatile memory, such as random access memory (RAM), cache memory), persistent storage (e.g., a hard disk, an optical drive such as a compact disk (CD) drive or digital versatile disk (DVD) drive, a flash memory, etc.), a communication interface (e.g., Bluetooth interface, infrared interface, network interface, optical interface, etc.), and numerous other elements and functionalities.

The computer processor(s) may be an integrated circuit for processing instructions. For example, the computer processor(s) may be one or more cores or micro-cores of a processor. The computing system may also include one or more input devices, such as a touchscreen, keyboard, mouse, microphone, touchpad, electronic pen, or any other type of input device.

The communication interface may include an integrated circuit for connecting the computing system to a network (e.g., a local area network (LAN), a wide area network (WAN) such as the Internet, mobile network, or any other type of network) and/or to another device, such as another computing device.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

The invention claimed is:

1. A system, comprising:
   a storage container for storing a plurality of physical storage items, wherein an identifier tag is integrated or attached with each of the plurality of physical storage items, the storage container comprising:
   at least one access plane which is passed through to add or remove each of the plurality of physical storage items in the storage container,
   a sensor configured to detect an event of adding or removing a storage item to the storage container with an identifier tag either by: (a) detecting the identifier tag crossing the access plane, or (b) monitoring a presence or an absence of the identifier tag within the storage container;
   a microphone and speaker for communicating with the system, wherein the microphone is configured to receive natural language audio input from a user and the speaker is configured to provide audio feedback to the user; and
   a processing unit, operatively connected to the storage container, sensors the microphone and the speaker, and configured to:
   track each of the plurality of physical storage items in the storage container,
   perform audio processing on the natural language audio input to determine title information and other metadata for each of the plurality of storage items being added to or removed from the storage container, wherein the natural language audio input is selected from a narrow domain of likely words associated with an application of the storage container,
   associate the title information and other metadata to the identifier tag associated with each of the plurality of physical storage items,
   store, in associated memory, the identifier tag mapped to the associated storage item, and
   change the title information or other metadata for at least one of the plurality of storage items based on natural language audio input provided a next time that the at least one storage item is being added to or removed from the storage container.

2. The system of claim 1, wherein the identifier tag is an automatic identification and data capture (AIDC) tag.

3. The system of claim 1, further comprising: a plurality of auxiliary sensors operatively connected to the processing unit for detecting one or more of the following: a weight of each of the plurality of storage items, a location of each of the plurality of storage items within the storage container, and passing of each of the plurality of storage items through the access plane.

4. The system of claim 1, wherein the processing unit is operatively connected to a cloud server comprising a database for storing and tracking each of the plurality of storage items, associated title information, and metadata for each item.

5. The system of claim 1, wherein the title information comprises at least one selected from a group consisting of: a name of the at least one physical storage item and a category of the at least one physical storage item, and a content of the at least one physical storage item, when the at least one physical storage item was added or removed from the storage container.

6. The system of claim 5, wherein a portion of the title information and/or a portion of the other metadata is not recognized by the system.

7. The system of claim 1, wherein the natural language audio input comprises a voice input forming a speech segment, and wherein the processing unit is further configured to:
  store, in the associated memory and as a portion of the title information or other metadata, the speech segment; and
  replay the speech segment as the audio feedback to the user.

8. The system of claim 7, wherein the speech segment is not recognized by the system, and is stored as part of the title information in the identifier tag in an original, unrecognizable form.

9. The system of claim 1, wherein the processing unit is further configured to:
  operate in an interactive mode, wherein the system prompts the user for additional information when the natural language audio input is not recognized by the system.

10. The system of claim 1, wherein the other metadata comprises at least one selected from a group consisting of: a timestamp for when the at least one physical storage item is added or removed from the storage container, an email notification related to the least one physical storage item, an expiry of the at least one physical storage item, an annotation associated with the at least one physical storage item, a calendar event related to the least one physical storage item.

11. The system of claim 1, wherein the processing unit is operatively connected to a server in the cloud computing environment, wherein the server comprises an artificial intelligence module that is configured to learn from the user input and historical user behavior, to estimate the other metadata and improve natural language audio input recognition.

12. A non-transitory computer readable medium comprising instructions, that when executed by a processing unit, are configured to perform a method, the method comprising:
  tracking each of a plurality of physical storage items in a storage container, wherein an identifier tag is integrated with each of the plurality of physical storage items, and wherein the storage container comprises:
    at least one access plane, which is passed through to add or remove each of the plurality of physical storage items in the storage container,
    a sensor configured to detect an event of adding or removing a storage item to the storage container with the identifier tag either by: (a) detecting the identifier tag crossing the access plane, or (b) monitoring a presence or an absence of the identifier tag within the container;
  receiving a natural language audio input from a user;
  performing audio processing on the natural language audio input to determine title information and other metadata for each of the plurality of physical storage items being added to or removed from the storage container, wherein the natural language audio input is selected from a narrow domain of likely words associated with an application of the storage container;
  associating the title information and other metadata to the identifier tag associated with each of the plurality of physical storage items,
  storing, in associated memory, the identifier tag mapped to the associated storage item, and
  changing the title information or other metadata for at least one of the plurality of storage items based on natural language audio input provided a next time that the at least one storage item is being added to or removed from the storage container.

13. The non-transitory computer readable medium of claim 12, wherein the natural language audio input comprises a voice input forming a speech segment, and wherein the method further comprises:
  storing, in the associated memory and as a portion of the title information, the speech segment; and
  replaying the speech segment as the audio feedback to the user.

14. The non-transitory computer readable medium of claim 13, wherein the speech segment is not recognized by the system, and is stored as part of the title information in the identifier tag in an original, unrecognizable form.

15. The non-transitory computer readable medium of claim 12, wherein the method further comprises:
  prompting, in an interactive mode, the user for additional information when the natural language audio input is not recognized by the system.

16. The non-transitory computer readable medium of claim 12, wherein the title information comprises at least one selected from a group consisting of: a name of the at least one physical storage item and a timestamp indicating when the at least one physical storage item was added or removed from the storage container.

17. The non-transitory computer readable medium of claim 16, wherein the title information is not recognized by the system.

18. The non-transitory computer readable medium of claim 12, wherein the natural language audio input comprises a voice input forming a speech segment, and wherein the method further comprises:
  storing, in the associated memory and as a portion of the title information, the speech segment; and
  replaying the speech segment as the audio feedback to the user.

19. The non-transitory computer readable medium of claim 18, wherein the speech segment is not recognized by the system, and is stored as part of the title information in the identifier tag in an original, unrecognizable form.

20. The non-transitory computer readable medium of claim 12, wherein the method further comprises:
  combining information from the sensor with information from a plurality of auxiliary sensors for detecting one or more of the following: a weight of each of the plurality of storage items, a location of each of the plurality of storage items within the storage container, and passing of each of the plurality of storage items through the access plane, to obtain a complete information for each of the plurality of storage items.

* * * * *